(12) United States Patent
Gerchikov et al.

(10) Patent No.: US 9,607,318 B1
(45) Date of Patent: Mar. 28, 2017

(54) METHOD AND SYSTEM FOR PROVIDING RELEVANT SALE EVENT NOTIFICATIONS USING FINANCIAL TRANSACTION DATA AND LOCATION DATA

(71) Applicant: Intuit Inc., Mountain View, CA (US)

(72) Inventors: Yuri Gerchikov, Edmonton (CA); Stewart E. Berg, Edmonton (CA); Kent Yip, Edmonton (CA)

(73) Assignee: Intuit Inc., Mountain View, CA (US)

( * ) Notice: Subject to any disclaimer, the term of this patent is extended or adjusted under 35 U.S.C. 154(b) by 800 days.

(21) Appl. No.: 14/031,456

(22) Filed: Sep. 19, 2013

(51) Int. Cl.
  *G06Q 30/00* (2012.01)
  *G06Q 30/02* (2012.01)
(52) U.S. Cl.
  CPC .............................. *G06Q 30/0259* (2013.01)
(58) Field of Classification Search
  CPC ................................................. G06Q 30/0251
  USPC ................................................. 705/14, 14.49
  See application file for complete search history.

(56) References Cited

U.S. PATENT DOCUMENTS

| 2002/0046084 | A1* | 4/2002 | Steele | G06Q 30/02 705/14.64 |
| 2008/0167937 | A1 | 7/2008 | Coughlin et al. | |
| 2008/0248815 | A1 | 10/2008 | Busch | |
| 2009/0076896 | A1 | 3/2009 | DeWitt et al. | |
| 2011/0246304 | A1* | 10/2011 | Hicks | G06Q 30/0261 705/14.58 |

FOREIGN PATENT DOCUMENTS

WO    WO 2008016885 A2 *  2/2008  ............ H04W 72/02

OTHER PUBLICATIONS

Jagannathan et al., "Method and System for Predicting Customer Flow and Arrival Times Using Positional Tracking of Mobile Devices," U.S. Appl. No. 12/750,926, filed Mar. 31, 2010.
Hicks et al., "Method and System for Providing Targeted Advertisements Based on Positional Tracking of Mobile Devices and Financial Data," U.S. Appl. No. 12/750,961, filed Mar. 31, 2010.

* cited by examiner

*Primary Examiner* — James A Reagan
(74) *Attorney, Agent, or Firm* — Hawley Troxell Ennis & Hawley LLP; Philip McKay

(57) ABSTRACT

Financial data associated with a consumer is obtained and analyzed to generate merchant watch list data associated with consumer. Sale events data is obtained associated with one or more sale events being sponsored by one or more merchants. Geographic position data associated with the consumer is the monitored and obtained. The merchant watch list data, the sale events data, and the geographic position data associated with the consumer, is then analyzed to identify matched sale event data representing sale events being sponsored by one or more merchants identified in the merchant watch list data and having sale event location data indicating a sale event location within a defined threshold distance of the approximate current geographic location of the consumer, and/or an anticipated future geographic location of the consumer. Sale event alert data is then provided to the consumer.

25 Claims, 2 Drawing Sheets

METHOD AND SYSTEM FOR PROVIDING RELEVANT SALE EVENT NOTIFICATIONS USING FINANCIAL TRANSACTION DATA AND LOCATION DATA

BACKGROUND

A common practice of merchants, e.g., providers of products and services, is to hold, or "sponsor" various types of sale events at various locations associated with the merchants, and/or at various dates and times throughout the year. In most cases, the merchants sponsoring sale events make every effort to announce the sale events to both existing and potential customers, i.e., consumers. However, in today's highly mobile and hectic world, is increasingly difficult for existing customers/consumers to learn of, and keep track of, sale events sponsored by, or associated with, all of the merchants they use on a recurring basis.

The situation is made even more difficult by the fact that while a consumer may do business with a given merchant at a given location on a recurring basis, the same merchant may sponsor a sale at a different location associated with the merchant and, in some cases, the different location may also be within a reasonable distance of the consumer, or at a location the consumer travels near on a regular basis.

As a result of the situation described above, many merchants currently miss the opportunity to attract existing customers to their sale events and therefore miss the opportunity to make potential sales and fully realize the benefits of their sponsored sale events. In addition, currently, many existing customers of merchants currently miss opportunities to save money on purchases made from merchants they already frequent.

What is needed, is a simple and efficient method and system for informing consumers of nearby sales sponsored by merchants with whom the consumers already have an existing business relationship.

SUMMARY

In accordance with one embodiment, financial data associated with a consumer is obtained. In one embodiment, the financial data associated with the consumer is analyzed to identify one or more merchants used by the consumer and to generate merchant watch list data associated with consumer, the merchant watch list data identifying one or more merchants used by the consumer whose sale event data is determined to be of potential interest to the consumer.

In one embodiment, sale event data is obtained from one or more sources, the sale events data indicting one or more sale events being sponsored by one or more merchants and sale event location data indicating the geographic location of the sale events.

In one embodiment, geographic position data associated with the consumer is monitored and obtained, the geographic position data associated with the consumer indicating an approximate current geographic location of the consumer, and/or an anticipated future geographic location of the consumer.

In one embodiment, the merchant watch list data, the sale events data, and the geographic position data associated with the consumer, is then analyzed to identify matched sale event data representing sale events being sponsored by one or more merchants identified in the merchant watch list data and having sale event geographic location data indicating a sale event location within a defined threshold distance of the approximate current geographic location of the consumer, and/or an anticipated future geographic location of the consumer. In one embodiment, sale event alert data is then provided to the consumer informing the consumer of any identified matched sale events.

Figure 1:
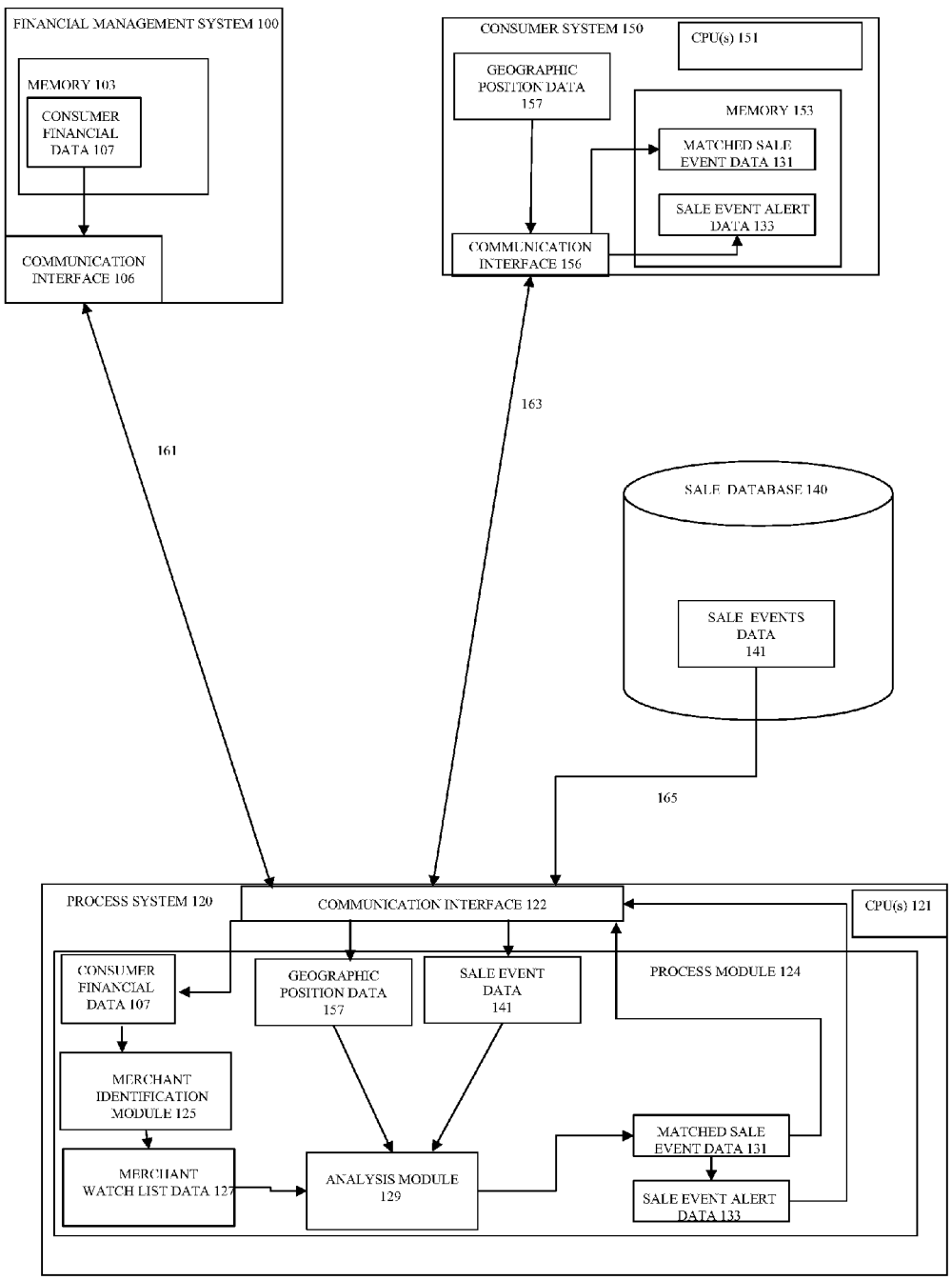
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for providing relevant sale event notifications using financial transaction data and location data includes a process for providing relevant sale event notifications using financial transaction data and location data implemented by one or more processors associated with one more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment, the process for providing relevant sale event notifications using financial transaction data and location data includes obtaining financial data associated with a consumer.

In one embodiment, the financial data associated with the consumer is obtained from one or more financial institutions, and/or financial institution websites. In one embodiment, the financial data associated with the consumer is obtained from one or more financial institution websites using the consumer's login information and screen scraping technology, and/or similar methods of obtaining data from a website.

In one embodiment, the financial transaction data associated with the consumer is obtained from one or more financial management systems.

Herein, a "financial management system" can be, but is not limited to, any of the following: a computing system implemented, or Internet-based, personal and/or business financial transaction management system; a computing system implemented, or Internet-based, personal and/or business financial management system; a computing system implemented, or Internet-based, personal and/or business asset management system; a computing system implemented, or Internet-based, personal and/or business accounting system; a computing system implemented, or Internet-based, point of sale system; a computing system implemented, or Internet-based, personal and/or business tax preparation system; a computing system implemented, or Internet-based, healthcare management system; and/or any of the numerous computing system implemented, or Internet-based, data management systems known to those of skill in the art.

Current financial management systems are typically software applications which, along with a parent computing system or device, help consumers/users manage their finances by providing a centralized interface with multiple financial accounts provided through banks, and/or credit card companies, and/or asset account providers, and/or mortgage companies, and/or retirement account providers, and/or other various financial and asset management institutions and/or accounts, for identifying, processing, storing, and categorizing user financial transactions conducted using the financial accounts. Currently, financial management systems typically obtain most, if not all, of the consumer's financial and/or transactional data from multiple financial accounts as well as a significant amount of the consumer's demographic and personal data.

Currently, financial management systems also typically obtain highly detailed financial transaction data from all, or most, financial accounts used by the consumer, such as payee identification, payee location, payment amount, date of the transaction, time of transaction, etc., via communication with banks, credit card providers, or other financial institutions, using data entry, links to databases, and electronic data transfer systems such as the Open Financial Exchange (OFX) specification, Web Direct, screen-scrapping technology, and/or various systems for transferring financial transaction data.

Using financial management systems, the financial transaction data, payee identification, payee location, payment amount, date of the transaction, various tags and/or labels, and other data is often used by the financial management system to process, categorize and/or tag individual financial transactions as a particular type of income or expense, to generate various financial reports, and to create an overview of the individual consumer's financial situation based on input from multiple, and often all, available sources of financial information regarding a given consumer, e.g., from multiple financial accounts associated with each consumer. Some currently offered financial management systems then use this financial transaction data to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports.

In one embodiment, the financial data associated with the consumer is analyzed to identify one or more merchants used by the consumer and to generate merchant watch list data associated with consumer, the merchant watch list data identifying one or more merchants used by the consumer whose sale event data is determined to be of potential interest to the consumer.

In one embodiment, the financial data associated with the consumer is financial transaction data indicating one or more of amounts, dates, times, and payees, associated with financial transactions conducted by the consumer. In one embodiment, the one or more merchants used by the consumer are identified by analyzing the payee information associated with the financial transaction data.

In one embodiment, the one or more merchants used by the consumer to be identified in the merchant watch list is determined by identifying a threshold number of financial transactions that include the one or more merchants as payees within a defined period of time. In various embodiments, the threshold number of financial transactions is defined by the consumer, and/or the provider of the process for providing relevant sale event notifications using financial transaction data and location data.

As a specific illustrative example, in one embodiment, the threshold number of financial transactions is defined as three over a six-month period. Consequently, in this specific illustrative example the financial data associated with the consumer from the past six months is analyzed to identify one or more merchants who are identified as payees in at least three financial transactions. In this specific illustrative example, these merchants are then identified as merchants whose sale event data is of potential interest to the consumer and they are then added to the merchant watch list data.

In one embodiment, the one or more merchants used by the consumer to be identified in the merchant watch list is determined by first generating a list of all merchants that are listed as payees in a threshold number of financial transactions. Then, in this embodiment, the list of these merchants is presented to the consumer and the consumer is provided the capability to designate one or more of the identified merchants as merchants used by the consumer whose sale event data is of interest to the consumer.

In one embodiment, the one or more merchants used by the consumer to be identified in the merchant watch list is determined by data entry from the consumer, i.e., by manual data entry, and/or designation, by the consumer.

In one embodiment, sale event data is obtained from one or more source. In various embodiments, the sale event data indicates one or more sale events being sponsored by one or more merchants and sale event location data indicating the geographic location of the sale events.

In one embodiment, the sale event data further includes sale event date and time data indicating the date, or dates, associated with the sale event and the time of day at which the sale event is taking, or is going to be taking, place.

In one embodiment, the sale event data is obtained from the merchants sponsoring the sale events. In some of these embodiments, the sale event data is provided through one or more user interfaces accessible by the merchants sponsoring the sale events. In other embodiments, the sale event data is provided by any means of providing sale event data to the process for providing relevant sale event notifications using financial transaction data and location data including, but not limited to, e-mail, text messaging, phone messages and POTS, postal service, or any other means for providing sale event data, as discussed herein, and/or as known in the art at the time of filing, and/or as developed after the time of filing.

In one embodiment, the sale event data is obtained from other consumers via posting to a website associated with the process for providing relevant sale event notifications using financial transaction data and location data, text messaging, e-mail, posting to one or more social media systems, and/or any other form of "crowdsourcing" and/or individual contribution, as discussed herein, and/or as known in the art at the time of filing, and/or as developed after the time of filing.

In one embodiment, the sale event data is obtained through one or more searches, and/or by web crawling techniques, conducted by, and/or on behalf of, the process for providing relevant sale event notifications using financial transaction data and location data.

In various embodiments, the sale event data is obtained by any means for obtaining sale event data as discussed herein, and/or as known in the art at the time of filing, and/or as developed after the time of filing.

In one embodiment, the sale event data is organized based on the merchants sponsoring the sale, and/or the date and time of the sale, and/or the geographic location of the sale. In one embodiment, the sale event data is then stored in a sale database, or other data store.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, geographic position data associated with the consumer is monitored and obtained. In one embodiment, the geographic position data associated with the consumer is data indicating an approximate current geographic location of the consumer, and/or an anticipated future geographic location of the consumer.

In one embodiment, geographic position data associated with the consumer is generated by a geographic position reporting function implemented on a computing system associated with the consumer. In one embodiment, the geographic position data is generated by a GPS, or similar geographic location system, implemented, at least in part, on a mobile computing system, such as a mobile phone or smartphone, associated with, and generally carried by, the consumer.

Herein a GPS capability refers to the ability to receive signals from, and/or communicate with, global positioning satellites to determine a consumer's location. In addition, in some embodiments, the global positioning satellite capability includes the ability to determine information about the consumer's location, such as store names, street addresses, phone numbers, e-mail addresses, web-sites, and other data associated with the consumer's location.

In one embodiment, the geographic position data associated with the consumer is determined by analyzing historical geographic position data associated with the consumer and using data analysis to project future geographical locations associated with the consumer.

As a specific illustrative example, if a consumer's historical geographic position data indicates the consumer travels to a position "X" at approximately the same time each day, week, or month, and that the current geographic position data associated with the consumer indicates the consumer is traveling towards position "X" at the approximate same time of day, week, or month, indicated by the historical geographic position data, it is assumed the consumer is indeed traveling to position "X" and will pass through all points/locations between the consumer's current geographic position and the geographic position of "X".

In one embodiment, the geographic position data associated with the consumer is determined by analyzing current geographic position data associated with the consumer and projecting a future geographical location associated with the consumer based on one or more historical factors associated with the consumer.

As a specific illustrative example, if recent geographic position data associated with a consumer indicates the consumer is heading on a given street in a given direction, is assumed the consumer will continue to travel on that street, in that direction, for a defined period of time. Consequently, it is assumed the consumer will pass through all points/locations on the given street in the determined direction that can be reached in the defined period of time.

In one embodiment, the geographic position data associated with the consumer is determined based on data obtained from a calendar function associated with the consumer indicating where the consumer is likely to be on a given date and time in the future.

As a specific illustrative example, in one embodiment, access is obtained to the consumer's calendar data and the consumer's calendar data is analyzed to determine appointments within the calendar that indicate a time and location where the consumer is likely to be at the identified time. In this specific illustrative example, the consumer's current geographic position data is used as a starting point/location and the location where the consumer is likely to be at the identified time is used as an ending point/location. In this specific illustrative example, all points/locations between the start point and the endpoint are considered locations the consumer is likely to pass through.

In one embodiment, the geographic position data associated with the consumer is monitored and updated on a continuous, or periodic, basis to obtain geographic position data associated with the consumer indicating an accurate approximate current geographic location of the consumer, and/or an anticipated future geographic location of the consumer.

In one embodiment, the merchant watch list data, the sale events data, and the geographic position data associated with the consumer, is then monitored and/or analyzed to identify matched sale event data for the consumer representing, and/or indicating, sale events being sponsored by the one or more merchants identified in the merchant watch list data and having sale event location data indicating a sale event location within a defined threshold distance of either the approximate current geographic location of the consumer, or an anticipated future geographic location of the consumer.

In one embodiment, the threshold distance between the geographic position of the consumer and the sale event is defined by the consumer. In one embodiment, the threshold distance between the geographic position of the consumer and the sale event is defined by the provider of the process for providing relevant sale event notifications using financial transaction data and location data.

In some embodiments, the threshold distance between the geographic position of the consumer and the sale event is defined in terms of the estimated travel time it would take the consumer to reach the geographic position of the sale event in light of current, or projected, traffic conditions in the area between the geographic position of the consumer and the geographic position of the sale event. In these embodiments, the travel time is estimated based on current, or projected, traffic conditions and travel time estimate data as provided by a third party traffic condition monitoring system.

Methods, means, systems, processes, and procedures, for obtaining third-party traffic condition monitoring system data are well known to those of skill in the art. Consequently, a more detailed discussion of particular examples of these systems is omitted here to avoid detracting from the invention.

As noted above, in one embodiment, the sale event data includes data indicating the date and time of the sale event. In one embodiment, travel times are estimated between the consumer's current, or projected, geographic position and the geographic position of the sale event so that the matched sale event data for the consumer includes data indicating whether the consumer has time to reach the geographic position of the sale event in time to take part in the sale event. That is to say, in one embodiment, the matched sale event data for the consumer includes data indicating whether or not the consumer has enough time to travel to the location of the sale event before the sale event is over and, in one embodiment, includes data indicating the remaining time window within which the consumer can travel to the location of the sale event before the sale event is over.

In one embodiment, sale event alert data is then provided to the consumer informing the consumer of any identified matched sale events and providing at least part of the matched sale event data for the consumer. In various embodiments, the sale event alert data is provided to the consumer in the form of, but not limited to, any of the following, a pop-up display alert; an SMS text message alert; an email alert; a phone call alert; an audible alert; a visual alert; an audio and visual alert; or any other form of alert, as discussed herein, and/or as known in the art at the time of filing, and/or as developed after the time of filing.

In one embodiment, the sale event alert data is provided to the consumer through a computing system associated with the consumer. In one embodiment, the sale event alert data is provided to the consumer through a mobile computing system associated with the consumer, such as, but not limited to, a cellular telephone, a smart phone, a digital wireless telephone, a Personal Digital Assistant (PDA), a notebook computing system, a tablet computing system, a portable computing system, a two-way pager, an Internet appliance, any other device, or any desired combination of these devices, that includes components that can execute all, or part, of a process for providing relevant sale event notifications using financial transaction data and location data, in accordance with at least one of the embodiments as described herein, and/or as known in the art at the time of filing, and/or as developed after the time of filing.

Using the system and method for providing relevant sale event notifications using financial transaction data and location data discussed herein, consumer financial data is leveraged to identify merchants actually used by a consumer on a recurring basis. In one embodiment, sale event data is then collected and searched to find sale events associated with the identified merchants used by the consumer. In one embodiment, the location of the sale events and location of the consumer are compared and sale events sponsored by merchants used by the consumer within a threshold distance of the consumer are identified. The consumer is then alerted to the existence of the sale events and provided information about the sale event. Consequently, using the system and method for providing relevant sale event notifications using financial transaction data and location data discussed herein, a simple and efficient method and system for informing consumers of nearby sales sponsored by merchants with whom the consumers already have an existing business relationship is provided.

Hardware System Architecture

FIG. 1 is a block diagram of an exemplary hardware architecture for implementing one embodiment of a process for providing relevant sale event notifications using financial transaction data and location data, such as exemplary process 200 (FIG. 2), discussed herein.

FIG. 1 includes financial management system 100, i.e., a computing system hosting and/or implementing a financial management system or server computing system hosting a financial institution's website; process system 120, e.g., a server system implementing at least part of a process for providing relevant sale event notifications using financial transaction data and location data; consumer system 150, e.g., a computing system accessible by a consumer such as a smart phone, including a geographic position tracking capability; and a sale database 140; all operatively coupled by communications channels 161, 163, and 165.

As seen in FIG. 1, financial management system 100 includes memory 103 and communication interface 106. As seen in FIG. 1, memory 103 includes consumer financial data 107. In various embodiments, financial management system 100 can be any computing system as discussed herein, and/or as known in the art at the time of filing, and/or as developed after the time of filing.

As seen in FIG. 1 process system 120 includes central processing unit(s) (CPUs 121), process module 124, and communications interface 122. As also seen in FIG. 1, process module 124 includes consumer financial data 107 as received from financial management system 100, via communication interface 106, communications channel 161, and communication interface 122; geographic position data 157, as received from consumer system 150, via communication interface 156, communications channel 163, and communication interface 122; sale events data 141, as received from sale data base 140 via communications channel 165 and communication interface 122. As also seen in FIG. 1, process module 124 includes merchant identification module 125 which generates merchant watch list data 127 and analysis module 129 which generates matched sale event data 131 and sale event alert data 133, sent to consumer system 150 via communication interface 122, communications channel 163, and communication interface 156. In various embodiments, process system 120 can be any computing system as discussed herein, and/or as known in the art at the time of filing, and/or as developed after the time of filing.

As seen in FIG. 1, consumer system 150 includes central processing unit(s) (CPUs 151), memory 153, geographic position data 157, and communications interface 156. As also seen in FIG. 1, memory 153 includes matched sale event data 131 and sale event alert data 133, as received from process system 120 via communication interface 122, communications channel 163, and communication interface 156. In various embodiments, consumer system 150 can be any computing system as discussed herein, and/or as known in the art at the time of filing, and/or as developed after the time of filing.

As seen in FIG. 1, sale database 140 includes sale events data 141.

In various embodiments, financial management system 100, and/or process system 120, and/or consumer system 150, may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

In one embodiment, one or all of communication channels 161, 163, and 165 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, financial data associated with a consumer, shown as consumer financial data 107 in FIG. 1, is obtained.

In one embodiment, consumer financial data 107 is obtained from one or more financial institutions, and/or financial institution websites, represented by financial management system 100 in FIG. 1. In one embodiment, consumer financial data 107 is obtained from one or more financial institution websites using the consumer's login information and screen scraping technology, and/or similar methods of obtaining data from a website.

In one embodiment, consumer financial data 107 is obtained from one or more financial management systems, represented by financial management system 100 in FIG. 1.

As noted above, herein, a "financial management system" can be, but is not limited to, any of the following: a computing system implemented, or Internet-based, personal and/or business financial transaction management system; a computing system implemented, or Internet-based, personal and/or business financial management system; a computing system implemented, or Internet-based, personal and/or business asset management system; a computing system implemented, or Internet-based, personal and/or business accounting system; a computing system implemented, or Internet-based, point of sale system; a computing system implemented, or Internet-based, personal and/or business tax preparation system; a computing system implemented, or Internet-based, healthcare management system; and/or any of the numerous computing system implemented, or Internet-based, data management systems known to those of skill in the art.

In one embodiment, consumer financial data 107 is transferred to process module 124 of process system 120 and is analyzed by merchant identification module 125 to identify one or more merchants used by the consumer and to generate merchant watch list data 127 associated with consumer, merchant watch list data 127 identifying one or more merchants used by the consumer whose sale event data is determined to be of potential interest to the consumer.

In one embodiment, consumer financial data 107 is financial transaction data indicating one or more of amounts, dates, times, and payees, associated with financial transactions conducted by the consumer. In one embodiment, the one or more merchants used by the consumer are identified by analyzing the payee information associated with the financial transaction data at merchant identification module 125.

In one embodiment, the one or more merchants used by the consumer to be identified in merchant watch list data 127 is determined at merchant identification module 125 by identifying a threshold number of financial transactions that include the one or more merchants as payees within a defined period of time. In various embodiments, the threshold number of financial transactions is defined by the consumer, and/or the provider of the process for providing relevant sale event notifications using financial transaction data and location data.

In one embodiment, the one or more merchants used by the consumer to be identified in merchant watch list data 127 is determined by first generating a list of all merchants that are listed as payees in a threshold number of financial transactions. Then, in this embodiment, the list of these merchants is presented to the consumer and the consumer is provided the capability to designate one or more of the identified merchants as merchants used by the consumer whose sale event data is of interest to the consumer.

In one embodiment, the one or more merchants used by the consumer to be identified in merchant watch list data 127 is determined at merchant identification module 125 by data entry from the consumer, i.e., by manual data entry, and/or designation, by the consumer.

In one embodiment, sale events data 141 is obtained from one or more sources. In various embodiments, sale events data 141 indicates one or more sale events being sponsored by one or more merchants and sale event location data indicating the geographic location of the sale events.

In one embodiment, sale events data 141 further includes sale event date and time data indicating the date, or dates, associated with the sale event and the time of day at which the sale event is taking, or is going to be taking, place.

In one embodiment, sale events data 141 is obtained from the merchants sponsoring the sale events. In some of these embodiments, sale events data 141 is provided through one or more user interfaces accessible by the merchants sponsoring the sale events (not shown). In other embodiments, sale events data 141 is provided by any means of providing sale event data to the process for providing relevant sale event notifications using financial transaction data and location data including, but not limited to, e-mail, text messaging, phone messages and POTS, postal service, or any other means for providing sale event data, as discussed herein, and/or as known in the art at the time of filing, and/or as developed after the time of filing.

In one embodiment, sale events data 141 is obtained from other consumers via posting to a website associated with the process for providing relevant sale event notifications using financial transaction data and location data (not shown), text messaging, e-mail, posting to one or more social media systems, and/or any other form of "crowdsourcing" and/or individual contribution, as discussed herein, and/or as known in the art at the time of filing, and/or as developed after the time of filing.

In one embodiment, sale events data 141 is obtained through one or more searches, and/or by web crawling techniques, conducted by, and/or on behalf of, the process for providing relevant sale event notifications using financial transaction data and location data.

In various embodiments, sale events data 141 is obtained by any means for obtaining sale event data as discussed herein, and/or as known in the art at the time of filing, and/or as developed after the time of filing.

In one embodiment, sale events data 141 is organized based on the merchants sponsoring the sale, and/or the date and time of the sale, and/or the geographic location of the sale. In one embodiment, sale events data 141 is then stored in sale database 140.

As noted above, as used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, geographic position data 157 associated with the consumer is monitored and obtained. In one embodiment, geographic position data 157 is data indicating an approximate current geographic location of the consumer, and/or an anticipated future geographic location of the consumer.

In one embodiment, geographic position data 157 is generated by a geographic position reporting function implemented on consumer system 150 (not shown). In one embodiment, geographic position data 157 is generated by a GPS, or similar geographic location system, implemented, at least in part, on consumer system 150 (not shown), such as a mobile phone or smartphone, associated with, and generally carried by, the consumer.

In one embodiment, geographic position data 157 is determined by analyzing historical geographic position data associated with the consumer and using data analysis to project future geographical locations associated with the consumer.

In one embodiment, geographic position data 157 is determined by analyzing current geographic position data associated with the consumer and projecting a future geographical location associated with the consumer based on one or more historical factors associated with the consumer.

In one embodiment, geographic position data 157 is determined based on data obtained from a calendar function associated with the consumer (not shown) indicating where the consumer is likely to be on a given date and time in the future.

In one embodiment, geographic position data 157 is monitored and updated on a continuous, or periodic, basis to obtain geographic position data associated with the consumer indicating an accurate approximate current geographic location of the consumer, and/or an anticipated future geographic location of the consumer.

In one embodiment, the merchant watch list data 127, sale events data 141, and geographic position data 157, is then monitored and/or analyzed by analysis module 129 to identify/generate matched sale event data 131 for the consumer representing, and/or indicating, sale events being sponsored by the one or more merchants identified in merchant watch list data 127 and having sale event location data indicating a sale event location within a defined threshold distance of either the approximate current geographic location of the consumer, or an anticipated future geographic location of the consumer, as indicated in geographic position data 157.

In one embodiment, the threshold distance between the geographic position of the consumer and the sale event is defined by the consumer. In one embodiment, the threshold distance between the geographic position of the consumer and the sale event is defined by the provider of the process for providing relevant sale event notifications using financial transaction data and location data.

In some embodiments, the threshold distance between the geographic position of the consumer and the sale event is defined in terms of the estimated travel time it would take the consumer to reach the geographic position of the sale event in light of current, or projected, traffic conditions in the area between the geographic position of the consumer and the geographic position of the sale event. In these embodiments, the travel time is estimated based on current, or projected, traffic conditions and travel time estimate data as provided by a third party traffic condition monitoring system.

Methods, means, systems, processes, and procedures, for obtaining third-party traffic condition monitoring system data are well known to those of skill in the art. Consequently, a more detailed discussion of particular examples of these systems is omitted here to avoid detracting from the invention.

As noted above, in one embodiment, sale events data 141 includes data indicating the date and time of the sale event. In one embodiment, travel times are estimated between the consumer's current, or projected, geographic position and the geographic position of the sale event so that matched sale event data 131 for the consumer includes data indicating whether the consumer has time to reach the geographic position of the sale event in time to take part in the sale event. That is to say, in one embodiment, matched sale event data 131 for the consumer includes data indicating whether or not the consumer has enough time to travel to the location of the sale event before the sale event is over and, in one embodiment, includes data indicating the remaining time window within which the consumer can travel to the location of the sale event before the sale event is over.

In one embodiment, sale event alert data 133 is then provided to consumer system 150 informing the consumer of any identified matched sale events and providing at least part of matched sale event data 131. In various embodiments, sale event alert data 133 is provided to the consumer in the form of, but not limited to, any of the following, a pop-up display alert; an SMS text message alert; an email alert; a phone call alert; an audible alert; a visual alert; an audio and visual alert; or any other form of alert, as discussed herein, and/or as known in the art at the time of filing, and/or as developed after the time of filing.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, financial management system 100, and/or process system 120, and/or consumer system 150, are not relevant.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, financial data associated with a consumer is obtained. In one embodiment, the financial data associated with the consumer is analyzed to identify one or more merchants used by the consumer and to generate merchant watch list data associated with consumer, the merchant watch list data identifying one or more merchants used by the consumer whose sale event data is determined to be of potential interest to the consumer.

In one embodiment, sale event data is obtained from one or more sources, the sale events data indicting one or more sale events being sponsored by one or more merchants and sale event location data indicating the geographic location of the sale events.

In one embodiment, geographic position data associated with the consumer is monitored and obtained, the geographic position data associated with the consumer indicating an approximate current geographic location of the consumer, and/or an anticipated future geographic location of the consumer.

In one embodiment, the merchant watch list data, the sale events data, and the geographic position data associated with the consumer, is then analyzed to identify matched sale event data representing sale events being sponsored by one or more merchants identified in the merchant watch list data and having sale event geographic location data indicating a sale event location within a defined threshold distance of the approximate current geographic location of the consumer, and/or an anticipated future geographic location of the consumer. In one embodiment, sale event alert data is then provided to the consumer informing the consumer of any identified matched sale events.

Figure 2:
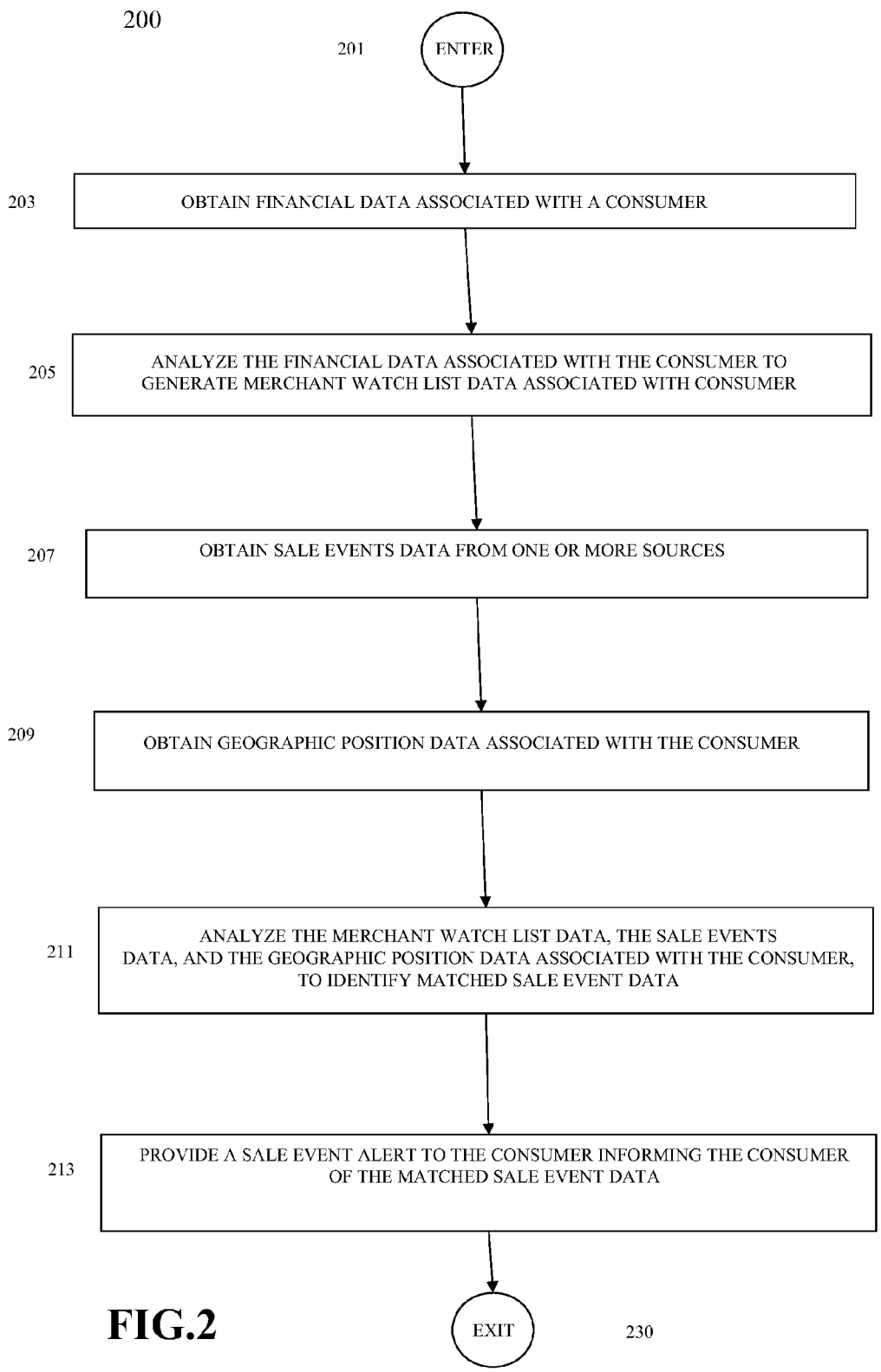
FIG. 2 is a flow chart depicting a process for providing relevant sale event notifications using financial transaction data and location data in accordance with one embodiment.

FIG. 2 is a flow chart depicting a process 200 for providing relevant sale event notifications using financial transaction data and location data in accordance with one embodiment. Process 200 for providing relevant sale event notifications using financial transaction data and location data begins at ENTER OPERATION 201 of FIG. 2 and process flow proceeds to OBTAIN FINANCIAL DATA ASSOCIATED WITH A CONSUMER OPERATION 203.

In one embodiment, at OBTAIN FINANCIAL DATA ASSOCIATED WITH A CONSUMER OPERATION 203 financial data associated with a consumer is obtained from one or more sources.

In one embodiment, at OBTAIN FINANCIAL DATA ASSOCIATED WITH A CONSUMER OPERATION 203 the financial data associated with the consumer is obtained from one or more financial institutions, and/or financial institution websites. In one embodiment, at OBTAIN FINANCIAL DATA ASSOCIATED WITH A CONSUMER OPERATION 203 the financial data associated with the consumer is obtained from one or more financial institution websites using the consumer's login information and screen scraping technology, and/or similar methods of obtaining data from a website.

In one embodiment, at OBTAIN FINANCIAL DATA ASSOCIATED WITH A CONSUMER OPERATION 203 the financial transaction data associated with the consumer is obtained from one or more financial management systems.

Herein, a "financial management system" can be, but is not limited to, any of the following: a computing system implemented, or Internet-based, personal and/or business financial transaction management system; a computing system implemented, or Internet-based, personal and/or business financial management system; a computing system implemented, or Internet-based, personal and/or business asset management system; a computing system implemented, or Internet-based, personal and/or business accounting system; a computing system implemented, or Internet-based, point of sale system; a computing system implemented, or Internet-based, personal and/or business tax preparation system; a computing system implemented, or Internet-based, healthcare management system; and/or any of the numerous computing system implemented, or Internet-based, data management systems known to those of skill in the art.

In one embodiment, once financial data associated with a consumer is obtained from one or more sources at OBTAIN FINANCIAL DATA ASSOCIATED WITH A CONSUMER OPERATION 203, process flow proceeds to ANALYZE THE FINANCIAL DATA ASSOCIATED WITH THE CONSUMER TO GENERATE MERCHANT WATCH LIST DATA ASSOCIATED WITH CONSUMER OPERATION 205.

In one embodiment, at ANALYZE THE FINANCIAL DATA ASSOCIATED WITH THE CONSUMER TO GENERATE MERCHANT WATCH LIST DATA ASSOCIATED WITH CONSUMER OPERATION 205 the financial data associated with the consumer of OBTAIN FINANCIAL DATA ASSOCIATED WITH A CONSUMER OPERATION 203 is analyzed to identify one or more merchants used by the consumer and to generate merchant watch list data associated with consumer, the merchant watch list data identifying one or more merchants used by the consumer whose sale event data is determined to be of potential interest to the consumer.

In one embodiment, the financial data associated with the consumer of ANALYZE THE FINANCIAL DATA ASSOCIATED WITH THE CONSUMER TO GENERATE MERCHANT WATCH LIST DATA ASSOCIATED WITH CONSUMER OPERATION 205 is financial transaction data indicating one or more of amounts, dates, times, and payees, associated with financial transactions conducted by the consumer. In one embodiment, the one or more merchants used by the consumer are identified by analyzing the payee information associated with the financial transaction data.

In one embodiment, the one or more merchants used by the consumer to be identified in the merchant watch list is determined at ANALYZE THE FINANCIAL DATA ASSOCIATED WITH THE CONSUMER TO GENERATE MERCHANT WATCH LIST DATA ASSOCIATED WITH CONSUMER OPERATION 205 by identifying a threshold number of financial transactions that include the one or more merchants as payees within a defined period of time. In various embodiments, the threshold number of financial transactions is defined by the consumer, and/or the provider of process 200 for providing relevant sale event notifications using financial transaction data and location data.

As a specific illustrative example, in one embodiment, the threshold number of financial transactions is defined as three over a six-month period. Consequently, in this specific illustrative example at ANALYZE THE FINANCIAL DATA ASSOCIATED WITH THE CONSUMER TO GENERATE MERCHANT WATCH LIST DATA ASSOCIATED WITH CONSUMER OPERATION 205 the financial data associated with the consumer from the past six months is analyzed to identify one or more merchants who are identified as payees in at least three financial transactions. In this specific illustrative example, these merchants are then identified as merchants whose sale event data is of potential interest to the consumer and they are then added to the merchant watch list data.

In one embodiment, the one or more merchants used by the consumer to be identified in the merchant watch list is determined at ANALYZE THE FINANCIAL DATA ASSOCIATED WITH THE CONSUMER TO GENERATE MERCHANT WATCH LIST DATA ASSOCIATED WITH CONSUMER OPERATION 205 by first generating a list of all merchants that are listed as payees in a threshold number of financial transactions. Then, in this embodiment, the list of these merchants is presented to the consumer and the consumer is provided the capability to designate one or more of the identified merchants as merchants used by the consumer whose sale event data is of interest to the consumer.

In one embodiment, the one or more merchants used by the consumer to be identified in the merchant watch list is determined at ANALYZE THE FINANCIAL DATA ASSOCIATED WITH THE CONSUMER TO GENERATE MERCHANT WATCH LIST DATA ASSOCIATED WITH CONSUMER OPERATION 205 by data entry from the consumer, i.e., by manual data entry, and/or designation, by the consumer.

In one embodiment, once the financial data associated with the consumer of OBTAIN FINANCIAL DATA ASSOCIATED WITH A CONSUMER OPERATION 203 is analyzed to identify one or more merchants used by the consumer and to generate merchant watch list data associated with consumer, the merchant watch list data identifying one or more merchants used by the consumer whose sale event data is determined to be of potential interest to the consumer, at ANALYZE THE FINANCIAL DATA ASSOCIATED WITH THE CONSUMER TO GENERATE MERCHANT WATCH LIST DATA ASSOCIATED WITH CONSUMER OPERATION 205, process flow proceeds to OBTAIN SALE EVENTS DATA FROM ONE OR MORE SOURCES OPERATION 207.

In one embodiment, at OBTAIN SALE EVENTS DATA FROM ONE OR MORE SOURCES OPERATION 207 sale event data is obtained from one or more source.

In various embodiments, the sale event data of OBTAIN SALE EVENTS DATA FROM ONE OR MORE SOURCES OPERATION 207 indicates one or more sale events being sponsored by one or more merchants and sale event location data indicating the geographic location of the sale events.

In one embodiment, the sale event data of OBTAIN SALE EVENTS DATA FROM ONE OR MORE SOURCES OPERATION 207 further includes sale event date and time data indicating the date, or dates, associated with the sale event and the time of day at which the sale event is taking, or is going to be taking, place.

In one embodiment, the sale event data of OBTAIN SALE EVENTS DATA FROM ONE OR MORE SOURCES OPERATION 207 is obtained from the merchants sponsoring the sale events. In some of these embodiments, the sale event data is provided through one or more user interfaces accessible by the merchants sponsoring the sale events.

In other embodiments, the sale event data of OBTAIN SALE EVENTS DATA FROM ONE OR MORE SOURCES OPERATION 207 is provided by any means of providing sale event data to process 200 for providing relevant sale event notifications using financial transaction data and location data including, but not limited to, e-mail, text messaging, phone messages and POTS, postal service, or any other means for providing sale event data, as discussed herein, and/or as known in the art at the time of filing, and/or as developed after the time of filing.

In one embodiment, the sale event data of OBTAIN SALE EVENTS DATA FROM ONE OR MORE SOURCES OPERATION 207 is obtained from other consumers via posting to a website associated with process 200 for providing relevant sale event notifications using financial transaction data and location data, text messaging, e-mail, posting to one or more social media systems, and/or any other form of "crowdsourcing" and/or individual contribution, as discussed herein, and/or as known in the art at the time of filing, and/or as developed after the time of filing.

In one embodiment, the sale event data of OBTAIN SALE EVENTS DATA FROM ONE OR MORE SOURCES OPERATION 207 is obtained through one or more searches, and/or by web crawling techniques, conducted by, and/or on behalf of, process 200 for providing relevant sale event notifications using financial transaction data and location data.

In various embodiments, the sale event data is obtained at OBTAIN SALE EVENTS DATA FROM ONE OR MORE SOURCES OPERATION 207 by any means for obtaining sale event data as discussed herein, and/or as known in the art at the time of filing, and/or as developed after the time of filing.

In one embodiment, at OBTAIN SALE EVENTS DATA FROM ONE OR MORE SOURCES OPERATION 207 the sale event data is organized based on the merchants sponsoring the sale, and/or the date and time of the sale, and/or the geographic location of the sale. In one embodiment, at OBTAIN SALE EVENTS DATA FROM ONE OR MORE SOURCES OPERATION 207 the sale event data is then stored in a sale database, or other data store.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, once sale event data is obtained from one or more sources at OBTAIN SALE EVENTS DATA FROM ONE OR MORE SOURCES OPERATION 207, process flow proceeds to OBTAIN GEOGRAPHIC POSITION DATA ASSOCIATED WITH THE CONSUMER OPERATION 209.

In one embodiment, at OBTAIN GEOGRAPHIC POSITION DATA ASSOCIATED WITH THE CONSUMER OPERATION 209 geographic position data associated with the consumer is monitored and obtained.

In one embodiment, the geographic position data associated with the consumer of OBTAIN GEOGRAPHIC POSITION DATA ASSOCIATED WITH THE CONSUMER OPERATION 209 is data indicating an approximate current geographic location of the consumer, and/or an anticipated future geographic location of the consumer.

In one embodiment, the geographic position data associated with the consumer of OBTAIN GEOGRAPHIC POSITION DATA ASSOCIATED WITH THE CONSUMER OPERATION 209 is generated by a geographic position reporting function implemented on a computing system associated with the consumer. In one embodiment, the geographic position data of OBTAIN GEOGRAPHIC POSITION DATA ASSOCIATED WITH THE CONSUMER OPERATION 209 is generated by a GPS, or similar geographic location system, implemented, at least in part, on a mobile computing system, such as a mobile phone or smartphone, associated with, and generally carried by, the consumer.

Herein a GPS capability refers to the ability to receive signals from, and/or communicate with, global positioning satellites to determine a consumer's location. In addition, in some embodiments, the global positioning satellite capability includes the ability to determine information about the consumer's location, such as store names, street addresses, phone numbers, e-mail addresses, web-sites, and other data associated with the consumer's location.

In one embodiment, the geographic position data associated with the consumer of is determined at OBTAIN GEOGRAPHIC POSITION DATA ASSOCIATED WITH THE CONSUMER OPERATION 209 by analyzing historical geographic position data associated with the consumer and using data analysis to project future geographical locations associated with the consumer.

As a specific illustrative example, if a consumer's historical geographic position data indicates the consumer travels to a position "X" at approximately the same time each day, week, or month, and that the current geographic position data associated with the consumer indicates the consumer is traveling towards position "X" at the approximate same time of day, week, or month, indicated by the historical geographic position data, it is assumed at OBTAIN GEOGRAPHIC POSITION DATA ASSOCIATED WITH THE CONSUMER OPERATION 209 that the consumer is indeed traveling to position "X" and will pass through all points/locations between the consumer's current geographic position and the geographic position of "X".

In one embodiment, the geographic position data associated with the consumer is determined at OBTAIN GEOGRAPHIC POSITION DATA ASSOCIATED WITH THE CONSUMER OPERATION 209 by analyzing current geographic position data associated with the consumer and projecting a future geographical location associated with the consumer based on one or more historical factors associated with the consumer.

As a specific illustrative example, if recent geographic position data associated with a consumer indicates the consumer is heading on a given street in a given direction, at OBTAIN GEOGRAPHIC POSITION DATA ASSOCIATED WITH THE CONSUMER OPERATION 209 is assumed the consumer will continue to travel on that street, in that direction, for a defined period of time. Consequently, it is assumed the consumer will pass through all points/locations on the given street in the determined direction that can be reached in the defined period of time.

In one embodiment, the geographic position data associated with the consumer is determined at OBTAIN GEOGRAPHIC POSITION DATA ASSOCIATED WITH THE CONSUMER OPERATION 209 based on data obtained from a calendar function associated with the consumer indicating where the consumer is likely to be on a given date and time in the future.

As a specific illustrative example, in one embodiment at OBTAIN GEOGRAPHIC POSITION DATA ASSOCIATED WITH THE CONSUMER OPERATION 209 access is obtained to the consumer's calendar data and the consumer's calendar data is analyzed at OBTAIN GEOGRAPHIC POSITION DATA ASSOCIATED WITH THE CONSUMER OPERATION 209 to determine appointments within the calendar that indicate a time and location where the consumer is likely to be at the identified time. In this specific illustrative example, the consumer's current geographic position data is used as a starting point/location and the location where the consumer is likely to be at the identified time is used as an ending point/location. In this specific illustrative example, all points/locations between the start point and the endpoint are considered locations the consumer is likely to pass through at OBTAIN GEOGRAPHIC POSITION DATA ASSOCIATED WITH THE CONSUMER OPERATION 209.

In one embodiment, the geographic position data associated with the consumer is monitored and updated at OBTAIN GEOGRAPHIC POSITION DATA ASSOCIATED WITH THE CONSUMER OPERATION 209 on a continuous, or periodic, basis to obtain geographic position data associated with the consumer indicating an accurate approximate current geographic location of the consumer, and/or an anticipated future geographic location of the consumer.

In one embodiment, once geographic position data associated with the consumer is monitored and obtained at OBTAIN GEOGRAPHIC POSITION DATA ASSOCIATED WITH THE CONSUMER OPERATION 209, process flow proceeds to ANALYZE THE MERCHANT WATCH LIST DATA, THE SALE EVENTS DATA, AND THE GEOGRAPHIC POSITION DATA ASSOCIATED WITH THE CONSUMER, TO IDENTIFY MATCHED SALE EVENT DATA OPERATION 211.

In one embodiment, at ANALYZE THE MERCHANT WATCH LIST DATA, THE SALE EVENTS DATA, AND THE GEOGRAPHIC POSITION DATA ASSOCIATED WITH THE CONSUMER, TO IDENTIFY MATCHED SALE EVENT DATA OPERATION 211 the merchant watch list data of ANALYZE THE FINANCIAL DATA ASSOCIATED WITH THE CONSUMER TO GENERATE MERCHANT WATCH LIST DATA ASSOCIATED WITH CONSUMER OPERATION 205, the sale events data of OBTAIN SALE EVENTS DATA FROM ONE OR MORE SOURCES OPERATION 207, and the geographic position data associated with the consumer of OBTAIN GEOGRAPHIC POSITION DATA ASSOCIATED WITH THE CONSUMER OPERATION 209, is monitored and/or analyzed to identify matched sale event data for the consumer representing, and/or indicating, sale events being sponsored by the one or more merchants identified in the merchant watch list data and having sale event location data indicating a sale event location within a defined threshold distance of either the approximate current geographic location of the consumer, or an anticipated future geographic location of the consumer.

In one embodiment, the threshold distance between the geographic position of the consumer and the sale event is defined by the consumer at ANALYZE THE MERCHANT WATCH LIST DATA, THE SALE EVENTS DATA, AND THE GEOGRAPHIC POSITION DATA ASSOCIATED WITH THE CONSUMER, TO IDENTIFY MATCHED SALE EVENT DATA OPERATION 211.

In one embodiment, the threshold distance between the geographic position of the consumer and the sale event is defined by the provider of process 200 for providing relevant sale event notifications using financial transaction data and location data at ANALYZE THE MERCHANT WATCH LIST DATA, THE SALE EVENTS DATA, AND THE GEOGRAPHIC POSITION DATA ASSOCIATED WITH THE CONSUMER, TO IDENTIFY MATCHED SALE EVENT DATA OPERATION 211.

In some embodiments, the threshold distance between the geographic position of the consumer and the sale event is defined at ANALYZE THE MERCHANT WATCH LIST DATA, THE SALE EVENTS DATA, AND THE GEOGRAPHIC POSITION DATA ASSOCIATED WITH THE CONSUMER, TO IDENTIFY MATCHED SALE EVENT DATA OPERATION 211 in terms of the estimated travel time it would take the consumer to reach the geographic position of the sale event in light of current, or projected, traffic conditions in the area between the geographic position of the consumer and the geographic position of the sale event. In these embodiments, the travel time is estimated based on current, or projected, traffic conditions and travel time estimate data as provided by a third party traffic condition monitoring system.

Methods, means, systems, processes, and procedures, for obtaining third-party traffic condition monitoring system data are well known to those of skill in the art. Consequently, a more detailed discussion of particular examples of these systems is omitted here to avoid detracting from the invention.

As noted above, in one embodiment, the sale event data of OBTAIN SALE EVENTS DATA FROM ONE OR MORE SOURCES OPERATION 207 includes data indicating the date and time of the sale event. In one embodiment, at ANALYZE THE MERCHANT WATCH LIST DATA, THE SALE EVENTS DATA, AND THE GEOGRAPHIC POSITION DATA ASSOCIATED WITH THE CONSUMER, TO IDENTIFY MATCHED SALE EVENT DATA OPERATION 211 travel times are estimated between the consumer's current, or projected, geographic position and the geographic position of the sale event so that the matched sale event data for the consumer includes data indicating whether the consumer has time to reach the geographic position of the sale event in time to take part in the sale event. That is to say, in one embodiment, the matched sale event data for the consumer of ANALYZE THE MERCHANT WATCH LIST DATA, THE SALE EVENTS DATA, AND THE GEOGRAPHIC POSITION DATA ASSOCIATED WITH THE CONSUMER, TO IDENTIFY MATCHED SALE EVENT DATA OPERATION 211 includes data indicating whether or not the consumer has enough time to travel to the location of the sale event before the sale event is over and, in one embodiment, includes data indicating the remaining time window within which the consumer can travel to the location of the sale event before the sale event is over.

In one embodiment, once the merchant watch list data of ANALYZE THE FINANCIAL DATA ASSOCIATED WITH THE CONSUMER TO GENERATE MERCHANT WATCH LIST DATA ASSOCIATED WITH CONSUMER OPERATION 205, the sale events data of OBTAIN SALE EVENTS DATA FROM ONE OR MORE SOURCES OPERATION 207, and the geographic position data associated with the consumer of OBTAIN GEOGRAPHIC POSITION DATA ASSOCIATED WITH THE CONSUMER OPERATION 209, is monitored and/or analyzed to identify matched sale event data for the consumer representing, and/or indicating, sale events being sponsored by the one or more merchants identified in the merchant watch list data and having sale event location data indicating a sale event location within a defined threshold distance of either the approximate current geographic location of the consumer, or an anticipated future geographic location of the consumer, at ANALYZE THE MERCHANT WATCH LIST DATA, THE SALE EVENTS DATA, AND THE GEOGRAPHIC POSITION DATA ASSOCIATED WITH THE CONSUMER, TO IDENTIFY MATCHED SALE EVENT DATA OPERATION 211, process flow proceeds to PROVIDE A SALE EVENT ALERT TO THE CONSUMER INFORMING THE CONSUMER OF THE MATCHED SALE EVENT DATA OPERATION 213.

In one embodiment, at PROVIDE A SALE EVENT ALERT TO THE CONSUMER INFORMING THE CONSUMER OF THE MATCHED SALE EVENT DATA OPERATION 213 sale event alert data is provided to the consumer informing the consumer of any identified matched sale events and providing at least part of the matched sale event data for the consumer of ANALYZE THE MERCHANT WATCH LIST DATA, THE SALE EVENTS DATA, AND THE GEOGRAPHIC POSITION DATA ASSOCIATED WITH THE CONSUMER, TO IDENTIFY MATCHED SALE EVENT DATA OPERATION 211.

In various embodiments, at PROVIDE A SALE EVENT ALERT TO THE CONSUMER INFORMING THE CONSUMER OF THE MATCHED SALE EVENT DATA OPERATION 213 the sale event alert data is provided to the consumer in the form of, but not limited to, any of the following, a pop-up display alert; an SMS text message alert; an email alert; a phone call alert; an audible alert; a visual alert; an audio and visual alert; or any other form of alert, as discussed herein, and/or as known in the art at the time of filing, and/or as developed after the time of filing.

In one embodiment, at PROVIDE A SALE EVENT ALERT TO THE CONSUMER INFORMING THE CONSUMER OF THE MATCHED SALE EVENT DATA OPERATION 213 the sale event alert data is provided to the consumer through a computing system associated with the consumer.

In one embodiment, at PROVIDE A SALE EVENT ALERT TO THE CONSUMER INFORMING THE CONSUMER OF THE MATCHED SALE EVENT DATA OPERATION 213 the sale event alert data is provided to the consumer through a mobile computing system associated with the consumer, such as, but not limited to, a cellular telephone, a smart phone, a digital wireless telephone, a Personal Digital Assistant (PDA), a notebook computing system, a tablet computing system, a portable computing system, a two-way pager, an Internet appliance, any other device, or any desired combination of these devices, that includes components that can execute all, or part, of a process for providing relevant sale event notifications using financial transaction data and location data, in accordance with at least one of the embodiments as described herein, and/or as known in the art at the time of filing, and/or as developed after the time of filing.

In one embodiment, once sale event alert data is provided to the consumer informing the consumer of any identified matched sale events and providing at least part of the matched sale event data for the consumer of ANALYZE THE MERCHANT WATCH LIST DATA, THE SALE EVENTS DATA, AND THE GEOGRAPHIC POSITION DATA ASSOCIATED WITH THE CONSUMER, TO IDENTIFY MATCHED SALE EVENT DATA OPERATION 211 at PROVIDE A SALE EVENT ALERT TO THE CONSUMER INFORMING THE CONSUMER OF THE MATCHED SALE EVENT DATA OPERATION 213, process flow proceeds to EXIT OPERATION 230.

In one embodiment, at EXIT OPERATION 230, process 200 for providing relevant sale event notifications using financial transaction data and location data is exited to await new data.

As a specific illustrative example of the implementation and operation of one embodiment of process 200 for providing relevant sale event notifications using financial transaction data and location data, assume at OBTAIN FINANCIAL DATA ASSOCIATED WITH A CONSUMER OPERATION 203 financial transaction data associated with a consumer is obtained from a financial transaction management system.

Further assume at ANALYZE THE FINANCIAL DATA ASSOCIATED WITH THE CONSUMER TO GENERATE MERCHANT WATCH LIST DATA ASSOCIATED WITH CONSUMER OPERATION 205 an analysis is performed and the merchants "Men's Wear Home", "Albert's", and "Cal's Cars" are identified as merchants used by the consumer who appear as payees in financial transactions conducted by the consumer at least 5 times in the last year, the threshold number of times. Further assume the identified merchants "Men's Wear Home", "Albert's", and "Cal's Cars" were shown to the consumer for approval and the consumer identified only "Men's Wear Home" and "Albert's" as merchants used by the consumer whose sale event data is of interest to the consumer. Consequently, at ANALYZE THE FINANCIAL DATA ASSOCIATED WITH THE CONSUMER TO GENERATE MERCHANT WATCH LIST DATA ASSOCIATED WITH CONSUMER OPERATION 205 merchant watch list data is generated listing only "Men's Wear Home" and "Albert's" as a merchants used by the consumer whose sale event data is of interest to the consumer.

Further assume the consumer currently shops only at the "Men's Wear Home" store located on First Street in "City A". In this specific illustrative example, it is stipulated that at OBTAIN SALE EVENTS DATA FROM ONE OR MORE SOURCES OPERATION 207 a second consumer is a user of process 200 for providing relevant sale event notifications using financial transaction data and location data and this second user provides a "crowdsourcing" contribution via text message indicting the "Men's Wear Home" store located on State street in "City B" is having a 50% off sale today only from LOAM to 5 PM and that this information is added to the sale events data in a sale database.

In this specific example, assume at OBTAIN GEOGRAPHICAL POSITION DATA ASSOCIATED WITH THE CONSUMER OPERATION 209 geographic position data associated with the first consumer, i.e., the consumer, is analyzed to project that since today, the sale day, is Tuesday, the consumer will be traveling through "City B" on his way to his gym at around 12:15 PM and will pass within a mile of the Men's Wear Home" store located on State street in "City B".

If the threshold distance for the consumer is one mile, or the 10 minutes it is estimated it will take to drive the one mile at 12:15 PM, then at ANALYZE THE MERCHANT WATCH LIST DATA, THE SALE EVENT DATA, AND THE GEOGRAPHICAL POSITION DATA ASSOCIATED WITH THE CONSUMER, TO IDENTIFY MATCHED SALE EVENT DATA OPERATION 211 matched sale event data for the consumer is generated indicating the nature/ description of the "Men's Wear Home" event, i.e., a 50% off sale, the location of the "Men's Wear Home" sale event, i.e., a "Men's Wear Home" store the consumer does not normally frequent, and may not even be aware of; the proximity of "Men's Wear Home" sale event to the projected geographical location of the consumer; the estimated time between the "Men's Wear Home" sale event and the projected geographical location of the consumer; and/or the hours of the "Men's Wear Home" sale event.

In this specific illustrative example, at PROVIDE A SALE EVENT ALERT TO THE CONSUMER INFORMING THE CONSUMER OF THE MATCHED SALE EVENT DATA OPERATION 213 sale event alert data is then provided to the consumer on the consumer's smart phone informing the consumer of the identified matched "Men's Wear Home" sale event and providing at least part of the matched sale event data for the consumer.

In various embodiments, the sale event alert data is provided to the consumer in the form of, but not limited to, any one or more of the following, a pop-up display alert; an SMS text message alert; an email alert; a phone call alert; an audible alert; a visual alert; an audio and visual alert; or any other form of alert, as discussed herein, and/or as known in the art at the time of filing, and/or as developed after the time of filing.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 200 for providing relevant sale event notifications using financial transaction data and location data discussed herein, consumer financial data is leveraged to identify merchants actually used by a consumer on a recurring basis. In one embodiment, sale event data is then collected and searched to find sale events associated with the identified merchants used by the consumer. In one embodiment, the location of the sale events and location of the consumer are compared and sale events sponsored by merchants used by the consumer within a threshold distance of the consumer are identified. The consumer is then alerted to the existence of the sale events and provided information about the sale event. Consequently, using process 200 for providing relevant sale event notifications using financial transaction data and location data discussed herein, a simple and efficient method and system for informing consumers of nearby sales sponsored by merchants with whom the consumers already have an existing business relationship is provided.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

The Abstract of the Disclosure is provided to comply with 37 C.F.R., section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing system implemented method for providing relevant sale event notifications using financial transaction data and location data comprising the following, which when executed individually or collectively by any set of one or more processors perform a process comprising:
   continuously monitoring, at a consumer device in the possession of a consumer, a geographical location of the consumer, the monitoring producing geographic location data indicating geographical locations of the consumer and data indicating when the consumer was located at the geographical locations;
   accumulating, by the consumer device, the geographical location data over time, resulting in historical geographic location data;
   predicting, at the consumer device, based on a current geographical location of the consumer and the historical geographic location data, one or more anticipated future geographic locations of the consumer;
   obtaining financial data associated with the consumer, at least a portion of the financial data being obtained from a financial institution of the consumer using login data of the consumer, at least a portion of the financial data being obtained from a personal financial management system of the consumer;
   analyzing the financial data associated with the consumer to generate merchant watch list data associated with consumer, the merchant watch list data identifying one or more merchants used by the consumer more than a threshold number of times during a predefined time period;
   obtaining sale events data from one or more sources including from one or more consumers via one or more crowd-sourcing systems, the sale events data indicating one or more sale events being sponsored by one or more of the identified merchants used by the consumer more than a threshold number of times during a predefined time period, the sales event data including sale event location data indicating geographic locations of the sale events;
   determining, using one or more of the anticipated future geographic locations of the consumer and the sale events data, projected traffic conditions in the area between the geographic location of the consumer and the geographic locations of the sale events;
   determining, using the projected traffic conditions in the area between the geographic location of the consumer and the geographic locations of the sale events, estimated travel times between anticipated future geographic locations of the consumer and the geographic locations of the sales events;
   analyzing the sale events data, the geographic position data associated with the consumer and the estimated travel times, to identify matched sale event data representing sale events having sale event location data indicating a sale event location the consumer can arrive at while the sale event is active; and
   providing sale event alert data to the consumer informing the consumer of the matched sale event data.

2. The computing system implemented method for providing relevant sale event notifications using financial transaction data and location data of claim 1 wherein the at least part of the financial data associated with the consumer is financial transaction data obtained from a financial transaction management system.

3. The computing system implemented method for providing relevant sale event notifications using financial transaction data and location data of claim 1 wherein the at least part of the financial data associated with the consumer is financial transaction data obtained from an online banking system.

4. The computing system implemented method for providing relevant sale event notifications using financial transaction data and location data of claim 1 wherein analyzing the financial data associated with the consumer to generate merchant watch list data associated with consumer includes identifying one or more merchants used by the consumer at two or more locations associated with the one or more merchants.

5. The computing system implemented method for providing relevant sale event notifications using financial transaction data and location data of claim 1 wherein at least part of the sale events data is obtained from one or more merchants sponsoring the sale events.

6. The computing system implemented method for providing relevant sale event notifications using financial transaction data and location data of claim 1 wherein the sale events data further includes sale event date and time data indicating the dates and times of the sale events.

7. The computing system implemented method for providing relevant sale event notifications using financial transaction data and location data of claim 6 wherein the merchant watch list data, the sale events data, and the geographic position data associated with the consumer, are analyzed to identify matched sale event data representing sale events being sponsored by one or more merchants identified in the merchant watch list data and having sale event location data indicating a sale event location at a sale event date and time such that the anticipated future geographic location of the consumer places the consumer within a defined threshold distance of the sale event location at the sale event date and time.

8. The computing system implemented method for providing relevant sale event notifications using financial transaction data and location data of claim 1 wherein geographic position data associated with the consumer is obtained from a geographic position reporting function associated with a mobile computing system associated with the consumer.

9. The computing system implemented method for providing relevant sale event notifications using financial transaction data and location data of claim 8 wherein the mobile computing system associated with the consumer is a mobile telephone associated with the consumer.

10. The computing system implemented method for providing relevant sale event notifications using financial transaction data and location data of claim 1 wherein geographic position data associated with the consumer is further obtained from an analysis of calendar data associated with the consumer.

11. The computing system implemented method for providing relevant sale event notifications using financial transaction data and location data of claim 1 wherein the sale event alert data is provided to the consumer through a mobile computing system in the possession of the consumer.

12. The computing system implemented method for providing relevant sale event notifications using financial transaction data and location data of claim 11 wherein the mobile computing system associated with the consumer is a mobile telephone associated with the consumer.

13. A system for providing relevant sale event notifications using financial transaction data and location data comprising:
  at least one processor; and
  at least one memory coupled to the at least one processor, the at least one memory having stored therein instructions which when executed by any set of the at least one processors, perform a process for providing relevant sale event notifications using financial transaction data and location data, the process for providing relevant sale event notifications using financial transaction data and location data including:
  continuously monitoring, at a consumer device in the possession of a consumer, a geographical location of the consumer, the monitoring producing geographic location data indicating geographical locations of the consumer and data indicating when the consumer was located at the geographical locations;
  accumulating, by the consumer device, the geographical location data over time, resulting in historical geographic location data;
  predicting, at the consumer device, based on a current geographical location of the consumer and the historical geographic location data, one or more anticipated future geographical locations of the consumer;
  obtaining financial data associated with the consumer, at least a portion of the financial data being obtained from a financial institution of the consumer using login data of the consumer, at least a portion of the financial data being obtained from a personal financial management system of the consumer;
  analyzing the financial data associated with the consumer to generate merchant watch list data associated with consumer, the merchant watch list data identifying one or more merchants used by the consumer whose sale event data is determined to be of potential interest to the consumer, the analysis including identifying one or more merchants used by the consumer more than a threshold number of times during a predefined time period;
  obtaining sale events data from one or more sources including from one or more consumers via one or more crowd-sourcing systems, the sale events data indicating one or more sale events being sponsored by one or more of the identified merchants used by the consumer more than a threshold number of times during a predefined time period, the sales event data including sale event location data indicating the geographic locations of the sale events;
  determining, using one or more of the anticipated future geographic locations of the consumer and the sale events data, projected traffic conditions in the area between the geographic location of the consumer and the geographic locations of the sale events;
  determining, using the projected traffic conditions in the area between the geographic location of the consumer and the geographic locations of the sale events, estimated travel times between anticipated future geographic locations of the consumer and the geographic locations of the sales events;
  analyzing the sale events data, the geographic position data associated with the consumer and the estimated travel times to identify matched sale event data representing sale events having sale event location data indicating a sale event location the consumer can arrive at while the sale event is active; and
  providing sale event alert data to the consumer informing the consumer of the matched sale event data.

14. The system for providing relevant sale event notifications using financial transaction data and location data of claim 13 wherein the at least part of the financial data associated with the consumer is financial transaction data obtained from a financial transaction management system.

15. The system for providing relevant sale event notifications using financial transaction data and location data of claim 13 wherein the at least part of the financial data associated with the consumer is financial transaction data obtained from an online banking system.

16. The system for providing relevant sale event notifications using financial transaction data and location data of claim 13 wherein analyzing the financial data associated with the consumer to generate merchant watch list data associated with consumer includes identifying one or more merchants used by the consumer at two or more locations associated with the one or more merchants.

17. The system for providing relevant sale event notifications using financial transaction data and location data of claim 13 wherein at least part of the sale events data is obtained from one or more merchants sponsoring the sale events.

18. The system for providing relevant sale event notifications using financial transaction data and location data of claim 13 wherein the sale events data further includes sale event date and time data indicating the dates and times of the sale events.

19. The system for providing relevant sale event notifications using financial transaction data and location data of claim 18 wherein the merchant watch list data, the sale events data, and the geographic position data associated with the consumer, are analyzed to identify matched sale event data representing sale events being sponsored by one or more merchants identified in the merchant watch list data and having sale event location data indicating a sale event location at a sale event date and time such that the anticipated future geographic location of the consumer places the consumer within a defined threshold distance of the sale event location at the sale event date and time.

20. The system for providing relevant sale event notifications using financial transaction data and location data of claim 13 wherein geographic position data associated with the consumer is obtained from a geographic position reporting function associated with a mobile computing system associated with the consumer.

21. The system for providing relevant sale event notifications using financial transaction data and location data of claim 20 wherein the mobile computing system associated with the consumer is a mobile telephone associated with the consumer.

22. The system for providing relevant sale event notifications using financial transaction data and location data of claim 13 wherein geographic position data associated with the consumer is further obtained from an analysis of calendar data associated with the consumer.

23. The system for providing relevant sale event notifications using financial transaction data and location data of claim 13 wherein the sale event alert data is provided to the consumer through a mobile computing system in the possession of the consumer.

24. The system for providing relevant sale event notifications using financial transaction data and location data of claim 23 wherein the mobile computing system associated with the consumer is a mobile telephone associated with the consumer.

25. A system for providing relevant sale event notifications using financial transaction data and location data comprising:
- at least one processor; and
- at least one memory coupled to the at least one processor, the at least one memory having stored therein instructions which when executed by any set of the at least one processors, perform a process for providing relevant sale event notifications using financial transaction data and location data, the process for providing relevant sale event notifications using financial transaction data and location data including:
- continuously monitoring, at a consumer device in the possession of a consumer, a geographical location of the consumer, the monitoring producing geographic location data indicating geographical locations of the consumer and data indicating when the consumer was located at the geographical locations;
- accumulating, by the consumer device, the geographical location data over time, resulting in historical geographic location data;
- predicting, at the consumer device, based on a current geographical location of the consumer and the historical geographic location data, one or more anticipated future geographic locations of the consumer;
- obtaining financial data associated with the consumer, at least a portion of the financial data being obtained from a financial institution of the consumer using login data of the consumer, at least a portion of the financial data being obtained from a personal financial management system of the consumer;
- analyzing the financial data associated with the consumer to generate merchant watch list data associated with consumer, the merchant watch list data identifying one or more merchants used by the consumer whose sale event data is determined to be of potential interest to the consumer, the analysis including identifying one or more merchants used by the consumer more than a threshold number of times during a predefined time period;
- obtaining sale events data from one or more sources including from one or more consumers via one or more crowd-sourcing systems, the sale events data indicating one or more sale events being sponsored by one or more of the identified merchants used by the consumer more than a threshold number of times during a predefined time period, the sales event data including sale event location data indicating the geographic location of the sale events;
- determining, using one or more of the anticipated future geographic locations of the consumer and the sale events data, projected traffic conditions in the area between the geographic location of the consumer and the geographic locations of the sale events;
- determining, using the projected traffic conditions in the area between the geographic location of the consumer and the geographic locations of the sale events, estimated travel times between anticipated future geographic locations of the consumer and the geographic locations of the sales events;
- analyzing the sale events data, the geographic position data associated with the consumer and the estimated travel times to identify matched sale event data representing sale events having sale event location data indicating a sale event location at a sale event date and time the consumer can arrive at while the sale event is active; and
- providing sale event alert data to the consumer device in the possession of the consumer, the sale event alert data informing the consumer of the matched sale event data.

* * * * *